(12) United States Patent
Yata et al.

(10) Patent No.: US 6,808,206 B2
(45) Date of Patent: Oct. 26, 2004

(54) IMPACT ABSORBING MEMBER

(75) Inventors: Tatsuo Yata, Kanagawa (JP); Hiroshi Kaneda, Kanagawa (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/428,847

(22) Filed: May 5, 2003

(65) Prior Publication Data

US 2003/0193179 A1 Oct. 16, 2003

Related U.S. Application Data

(62) Division of application No. 09/730,551, filed on Dec. 7, 2000, now abandoned.

(30) Foreign Application Priority Data

Dec. 10, 1999 (JP) .......................................... H11-351973
Aug. 3, 2000 (JP) ...................................... 2000-235891

(51) Int. Cl.⁷ .............................................. B60R 21/04
(52) U.S. Cl. ........................ 280/751; 428/158; 428/160
(58) Field of Search ............................... 280/751, 752, 280/753; 296/187.03; 428/158, 160

(56) References Cited

U.S. PATENT DOCUMENTS

| | | | | |
|---|---|---|---|---|
| 3,989,275 A | * | 11/1976 | Finch et al. ................. 280/751 |
| 4,114,948 A | * | 9/1978 | Perkey ........................ 297/397 |
| 4,190,697 A | * | 2/1980 | Ahrens ..................... 428/309.9 |
| 4,828,287 A | * | 5/1989 | Siler ........................... 280/751 |
| 4,919,483 A | * | 4/1990 | Horkey ........................ 297/395 |
| 5,306,066 A | * | 4/1994 | Saathoff ................... 296/146.6 |
| 5,419,088 A | * | 5/1995 | Raymond et al. ................ 52/1 |
| 5,636,866 A | * | 6/1997 | Suzuki et al. ............... 280/748 |
| 5,649,721 A | * | 7/1997 | Stafford et al. ............. 280/751 |
| 5,836,547 A | * | 11/1998 | Koch et al. ............. 244/122 R |
| 5,867,840 A | * | 2/1999 | Hirosawa et al. ............... 2/414 |
| 5,928,755 A | * | 7/1999 | Mullen ........................ 428/102 |
| 6,036,227 A | * | 3/2000 | Lin et al. ..................... 280/751 |
| 6,136,879 A | * | 10/2000 | Nishida et al. .............. 521/174 |
| 6,247,745 B1 | * | 6/2001 | Carroll et al. ............... 188/371 |
| 6,342,288 B1 | * | 1/2002 | Tada et al. .................. 428/158 |

FOREIGN PATENT DOCUMENTS

| | | | |
|---|---|---|---|
| JP | 6-42437 | * | 6/1994 |
| JP | 6-211088 | * | 8/1994 |
| JP | 7-16867 | * | 1/1995 |
| JP | 8-2358 | * | 1/1996 |
| JP | 8-72642 | * | 3/1996 |
| JP | 8-142234 | * | 6/1996 |
| JP | 8-295194 | * | 11/1996 |
| JP | 2000-6741 | * | 1/2000 |

* cited by examiner

Primary Examiner—Christopher P. Ellis
Assistant Examiner—Christopher Bottorff
(74) Attorney, Agent, or Firm—Manabu Kanesaka

(57) ABSTRACT

An impact absorbing member is made of rigid polyurethane foam, and has a plate shape and recesses formed in at least one surface thereof such that the recesses are arranged in parallel along one direction. Each recess has a triangle section in a depth direction of the impact absorbing member, and has a sectional area decreasing toward a bottom thereof.

9 Claims, 12 Drawing Sheets

IMPACT ABSORBING MEMBER

CROSS REFERENCE TO RELATED APPLICATION

This is a divisional application of patent application Ser. No. 09/730,551 filed on Dec. 7, 2000 now abandoned.

FIELD OF THE INVENTION AND RELATED ART STATEMENT

The present invention relates to an impact absorbing member and, particularly to an impact absorbing member which is suitably adapted to absorb impact energy exerted on the head of an occupant in a vehicle cabin to reduce the head injury criteria value in the event of a vehicle collision.

The followings are impact absorbing members for use in vehicles which have been conventionally proposed.

(1) An impact absorbing member comprises a resin pillar garnish having a hollow shape wherein a hollow is filled with rigid polyurethane foam for absorbing impact energy (Japanese Patent H06-42437A).
(2) A pad member is made of foamed material or rubber material (a prior art description of Japanese Patent H08-2358A).
(3) A cushion body is made of rigid polyurethane foam and is covered by a shape keeping member of sheet metal having a recess formed therein (Japanese Patent H08-72642A).
(4) An impact absorbing member is provided by using a garnish (trim) (Japanese Patent H06-211088A).
(5) An impact absorbing member is made of resin beads and has a number of ribs formed on one surface (Japanese Patent H07-16867A).
(6) An impact absorbing member is constituted of a polyolefin resin material which has ribs arranged in a lattice shape (Japanese Patent H08-142234A, Japanese Patent H08-295194A).

The aforementioned conventional impact absorbing members have the following drawbacks, respectively.

The impact absorbing member disclosed in Japanese utility model H06-42437A uses the rigid polyurethane foam as the head protective material. However, it has a structure complex with the hollow resin piece (garnish). Therefore, the rigid polyurethane foam is required to have low compressive strength of 0.02 to 0.2 MPa. This means that this does not take advantage of characteristics of the rigid polyurethane foam. The purpose of its concave and convex shape is just to reduce the weight and to keep the strength, and not to improve the energy absorbing capacity. Therefore, this does not have improved energy absorbing capacity.

The impact absorbing member disclosed as a prior art of Japanese Patent H08-2358A is an example of a pad member for absorbing impact made of foamed material or rubber material. In this example, the pad member is elastically deformed and thus does not suggest the usage of rigid polyurethane foam. Portions of a corrugated section attached to a vehicle body are extremely thin. To obtain sufficient energy absorbing capacity, the thickness of the pad member should be large. Accordingly, the cabin space of the vehicle is reduced, thus worsening the comfort, the facility of riding, and further the visibility.

The impact absorbing structure disclosed in Japanese Patent H08-72642A has a concave shape as a whole, but a soft or rigid polyurethane form itself used as crushing material does not have a recess for improving the energy absorbing capacity. The purpose of a recess formed in the impact absorbing structure is just installation, not improvement of the energy absorbing capacity. In this publication, it is stated that it can not exhibit sufficient energy absorbing efficiency if the entire rigidity is too high or too low. However, there is no description about specific value and range. It is hard to say that this impact absorbing structure securely exhibits excellent energy absorbing efficiency.

The impact absorbing member disclosed in Japanese Patent H06-211088A has a structure to be fixed together with a garnish to a vehicle body by fasteners so that the garnish is necessary for installation of this impact absorbing member. For utilizing the impact absorbing member as a head protective member, the location adaptability is limited, for example, it is not suitably adapted to a side rail. The impact absorbing member does not have a concavity or convexity. Though it is stated that the impact absorbing member has such a thickness as to absorb impact energy, there is no description about specific thickness and hardness. It is also hard to say that the impact absorbing member securely exhibits excellent energy absorbing efficiency.

The impact absorbing member disclosed in Japanese Patent H07-16867A is made of resin beads. When a force is locally exerted on a surface of the impact absorbing member by a spherical body such as a head dummy, the force focuses on beam portions between the ribs, thus not obtaining sufficient impact absorbing capacity. If the impact absorbing member having the aforementioned configuration is made of rigid polyurethane foam, the beam portions may be broken, thus not obtaining sufficient stroke for absorbing impact energy.

According to the impact absorbing member disclosed in Japanese Patent H08-142234A and Japanese Patent H08-295194A, the thickness of the lattice-shaped ribs is small such as 0.6 to 1.2 mm. In addition, since the ribs made of polyolefin resin material absorbs energy generally by the bending of the ribs, the impact absorbing member has a drawback that the capacity has high dependence of the direction of impact.

As mentioned above, any one of the aforementioned conventional impact absorbing members is not the one whose configuration is positively devised to obtain the optimal energy absorbing capacity. Accordingly, high energy absorbing capacity can not be imparted to these impact absorbing members.

On the other hand, at pillars and side rails in an automobile, the dimension in thickness has a greater effect on the comfort in the cabin and the visibility for the safety. To reduce the head injury criteria value to protect the occupant without impairing these factors, an impact absorbing member is required which is thin, but can exhibit sufficient energy absorbing efficiency.

As an impact absorbing member for use in vehicles which can solve the aforementioned problems and which has excellent energy absorbing capacity and is suitably adapted to absorb impact energy exerted on the head of an occupant in a vehicle cabin to reduce the head injury criteria value in the event of a vehicle collision, an impact absorbing member has been previously proposed by the applicant of this application, which has a plate-like configuration and is made of rigid polyurethane foam having compressive strength of a predetermined value or more, and which has recesses formed in at least one surface thereof (Japanese Patent 2000-6741A) published on Jan. 11, 2000, a corresponding European application of which is EP 967124 A2 published on Dec. 29, 1999.

In this impact absorbing member, walls between adjacent recesses of the impact absorbing member made of rigid polyurethane foam are broken to absorb impact energy. The broken walls sequentially enter the recesses, thereby obtaining stable energy absorbing capacity. The entrance of the walls into the recesses provides the stroke for absorbing energy, thereby sufficiently reducing the head injury criteria value suffered by an occupant.

In this impact absorbing member, it is preferred that the ratio of the volume of the recesses to the sum of the volume of solid portions made of the rigid polyurethane foam and the volume of the recesses (hereinafter, sometimes referred to as "recess volume ratio") is 10 to 40%.

Therefore, the object of the present invention is to provide an impact absorbing member for use in vehicles which is an improvement over the impact absorbing member of Japanese Patent 2000-6741A and which has excellent energy absorbing capacity and is suitably adapted to absorb impact energy exerted on the head of an occupant in a vehicle cabin to reduce the head injury criteria value in the event of a vehicle collision.

SUMMARY OF THE INVENTION

An impact absorbing member of the present invention is made of rigid polyurethane foam and has a plate-like shape, and includes recesses formed in at least one surface thereof to be arranged in parallel along one direction, wherein each recess is formed in such a shape as to have sectional area decreasing toward the deepest point.

It is preferable that the shape of each recess is acute at the bottom in the depth direction of the impact absorbing member.

The inventors of this application made efforts for improving the energy absorbing capacity of the impact absorbing member disclosed in Japanese Patent 2000-6741A. As a result of their efforts, they found that the impact absorbing member formed with recesses having such a shape decreasing toward the bottom in the depth direction of the impact absorbing member, for example having a triangular section along the depth direction of the impact absorbing direction, has higher energy absorbing capacity as compared to the impact absorbing member formed with recesses each having rectangular section even with the same recess volume ratio. This means that the impact absorbing member formed with such recesses can be effectively used for reducing the head injury criteria value. By this finding, the present invention was accomplished.

It should be noted that a recess having an acute bottom in the depth direction of the impact absorbing member of the present invention will be sometimes referred to as "acute-bottom recess". In the present invention, the "triangle" on the section view of the recess has the apex angle at the deeper side of the recess.

According to the present invention, the compressive strength of the rigid polyurethane foam constituting the impact absorbing member is preferably $3 \times 10^{-1}$ MPa or more to effectively exhibit the impact energy absorbing efficiency by the breakage of the rigid polyurethane foam portion between the recesses and also the impact energy absorbing efficiency or capacity by the entrance of the broken portion into the recesses.

According to the present invention, it is preferable that the recess volume ratio (the ratio of the volume of the recesses to the total of the volume of the rigid polyurethane foam portion and the volume of the recesses of the impact absorbing member) is 3 to 40%.

When the impact absorbing member has a shape lengthwise in one direction, the recesses are preferably formed in a portion other than both end portions of the impact absorbing member.

The impact absorbing member of the present invention having the aforementioned construction is suitably used as a head protective member for use in vehicles in a state attached to a vehicle body or an interior equipment such as a head liner and a garnish.

A head protective member of the present invention is formed in a lengthy rectangular shape and is constituted of a rigid polyurethane foam having hardness of 0.3 MPa or more, a thickness of the head protective member is 15 to 25 mm and the effective width of portions mainly absorbing impact is 30 to 40 mm.

In the present invention, the hardness of material is measured by the following steps (i)–(iii).

(i) A sample having a thickness 50 mm×a width 50 mm×a length 50 mm (if this size is not obtained, an available size may be applied) is prepared from the material.

(ii) This sample is compressed at a speed of 10 to 50 mm/min in a direction of thickness for a distance of 80% of the original thickness (for a distance of 40 mm when the sample is 50 mm in thickness, i.e. to be 10 mm).

(iii) The load when the sample is compressed to be 50% of the original thickness (25 mm of the sample is compressed if the sample is 50 mm in thickness) is measured. The hardness (MPa, $N/cm^2$) is obtained by dividing the measured load by the sectional area.

When the head protective member has no slit, the effective width is equal to the actual width of the head protective member. When the head protective member has a slit, the effective width is the sum of widths of solid portions having hardness of 0.3 MPa. It should be noted that the effective width of portions mainly absorbing impact of the head protective member of the present invention is referred to just as "effective width".

According to the head protective member which is constituted of a rigid polyurethane foam having hardness of 0.3 MPa or more, the thickness of the head protective member is 15 to 25 mm and the effective width is 30 to 40 mm, the HIC value is 800 or less, by which excellent energy absorbing capacity can be achieved.

The HIC value means the head injury criteria value (HIC (d)) calculated from acceleration of impact exerted on a dummy in dynamic evaluation tests using dummies. In general, the HIC value of 1000 or less indicates excellent energy absorbing capacity. In car manufacturers, developments are made to have a HIC value of 800 or less for the purpose of increasing the certainty.

A head protective member of the present invention has, for example, a slit formed in the head protective member by hollowing in the depth direction to extend in the longitudinal direction, such that the sum of widths of solid portions other than the slit is set to be 30 to 40 cm. In this case, it is preferable that the width of the slit is 5 to 20 cm. In addition, it is preferable that the hardness of the material constituting the head protective member is 1.2 to 1.6 MPa.

The head protective member may have a plate-like body without having a slit formed by hollowing in the depth direction. In this case, it is preferable that the hardness of the material constituting the head protective member is 1.0 to 1.4 MPa.

The head protective member is suitably used in a vehicle in a state attached to a vehicle body or an interior equipment such as a head liner and a garnish.

BRIEF DESCRIPTION OF THE DRAWINGS

FIGS. 1a–1d show an embodiment of the impact absorbing member of the present invention, wherein

FIGS. 2a–2d show another embodiment of the impact absorbing member of the present invention, wherein

FIGS. 3a–3d show further another embodiment of the impact absorbing member of the present invention, wherein

FIGS. 4a–4d show an embodiment of the impact absorbing member of the present invention, wherein

FIGS. 11a–11d show an impact absorbing member according to a comparative example, wherein

DETAILED DESCRIPTION OF PREFERRED EMBODIMENTS

Hereinafter, embodiments of the present invention will be described with reference to the attached drawing.

FIGS. 1a through 4d are views showing embodiments of the impact absorbing member of the present invention, wherein FIGS. 1a, 2a, 3a and 4a are plan views, FIGS. 1b, 2b, 3b 4b, 1c, 2c, 3c, and 4c are sectional views, and FIGS. 1d, 2d, 3d and 4d are perspective views. Numerical values in FIGS. 1a through 4a just indicate dimensions related to the embodiments described later, and are not limitative to any of the dimensions of the impact absorbing member of the present invention.

An impact absorbing member 1 shown in FIGS. 1a–1d has a body 2 like a plate made of rigid polyurethane foam and recesses 3 on a top surface of the body 2. The recesses are formed in a ship's bottom configuration, i.e. which is hexagon on the plan view and triangular on a sectional view along a direction perpendicular to the longitudinal direction. The recesses 3 are arranged in parallel in the width direction and adjacent to each other. A rigid polyurethane foam portion 4 stands between the adjacent recesses 3, 3. The rigid polyurethane foam portion 4 is broken by impact and the broken portion 4 enters into the recess 3, thereby exhibiting excellent energy absorbing efficiency.

An impact absorbing member 1A shown in FIGS. 2a–2d has a body 2A like a plate and recesses 3A on both surfaces of the body 2A. The recesses 3A have a similar shape of the recess 3 of the impact absorbing member 1 shown in FIGS. 1a to 1d but have a smaller depth. The recesses are formed in both surfaces of the plate body 2A in pairs such that each pair of recesses 3A is arranged in parallel in the width direction of the body 2A. Also in this impact absorbing member 1A, each rigid polyurethane foam portion 4A between the adjacent recesses 3A, 3A is broken by impact and the broken portion enters into the recess 3A, thereby exhibiting excellent energy absorbing efficiency.

An impact absorbing member 1B shown in FIGS. 3a–3d has a body 2B like a plate and recesses 3B on a top surface of the body 2B. The recesses 3B have a square pyramid shape. The recesses 3B are arranged in two rows in the width direction and in six rows in the longitudinal direction of the body 2B. Also in this impact absorbing member 1B, each rigid polyurethane foam portion 4B between the adjacent recesses 3B, 3B is broken by impact and the broken portion enters into the recess 3B, thereby exhibiting excellent energy absorbing efficiency.

An impact absorbing member 1C shown in FIGS. 4a–4d has a body 2C like a plate and recesses 3C on a top surface of the body 2C. The recesses have a triangular pyramid shape. The ten recesses 3C arranged in the width direction and in the longitudinal direction of the body 2C, but this is not limitative. Also in this impact absorbing member 1C, each rigid polyurethane foam portion 4C between the adjacent recesses 3C, 3C is broken by impact and the broken portion enters into the recess 3C, thereby exhibiting excellent energy absorbing efficiency.

The rigid polyurethane foam constituting the impact absorbing member preferably has a compressive strength of $3 \times 10^{-1}$ MPa or more. A rigid polyurethane foam having compressive strength less than $3 \times 10^{-1}$ MPa provides insufficient strength of the rigid polyurethane foam portion between the recesses. In this case, this portion is easily broken at an initial stage of application of impact, so the impact absorbing member can not exhibit sufficient energy absorbing efficiency. The compressive strength of the rigid polyurethane foam is more preferably in a range between $3 \times 10^{-1}$ MPa and $4 \times 10^{0}$ MPa.

When the recess volume ratio exceeds 40%, the energy absorbing efficiency is insufficient at the initial stage in the same manner as mentioned above. When the recess volume ratio is less than 3%, i.e. too low, there is insufficient space for the escape of the broken rigid polyurethane foam portion between the recesses, so the impact absorbing member can not provide sufficient stroke for absorbing energy. This means that the impact absorbing member can not exhibit sufficient energy absorbing efficiency at a medium stage and a last stage of the application of impact. Accordingly, the recess volume ratio is preferably 3 to 40%, particularly preferably 5 to 35%.

As shown in FIGS. 1a–4d, when the impact absorbing member has a lengthy rectangular shape, the recesses are preferably formed in an area other than the both end portions in the longitudinal direction. The area where the recesses are formed preferably has a length of 5/10 to 9/10 of the entire length about the center in the longitudinal direction of the impact absorbing member. The ratio of the recesses only to the area where the recesses are formed is preferably 7 to 45%.

The arrangement of the recesses is not limited to the aforementioned embodiments shown in FIGS. 1a–4d without space between adjacent recesses. The recesses may be arranged at intervals to leave rigid polyurethane foam faces 4D between adjacent recesses 3D, 3D as shown in FIG. 5. However, too large interval W reduces the recess volume ratio and thus loses the energy absorbing capacity. Therefore, the interval should be 15 mm or less, particularly 10 mm or less. It is preferable that the adjacent recesses are in contact with each other at the top surface of the plate-like body.

When the array pitch of the recesses (the distance between the centers of the adjacent recesses on the plan view) is more than 80 mm, variations in energy absorbing capacity may be locally caused on the surface of the impact absorbing member where the recesses are formed. Therefore, the array pitch of the recesses is preferably 80 mm or less. However, since the too small array pitch should make the recess volume ratio insufficient, the array pitch is preferably 5 mm or more.

There is no specific limitation to the size of each recess, so the size of each recess may be suitably selected according its shape to satisfy the conditions of the aforementioned array pitch and said recess volume ratio.

The depth of the recesses is suitably selected, according to the array pitch and the width of the rigid polyurethane foam portion between adjacent recesses, within a range satisfying the aforementioned recess volume ratio. Generally, the depth of the recesses (in case of recesses formed in both surfaces of the plate-like body, the sum of the depths of the opposite recesses) is preferably in a range from 1/3 to 3/4 of the entire thickness of the impact absorbing member.

According to the present invention, there is no specific limitation to the shape of the recess on the plan view, so the recesses may have any shape such as a parallelogram, a trapezoid, a circle, an oval, and a guitar-shape, in addition to the hexagon as shown in FIGS. 1a–2d, the square as shown in FIGS. 3a–3d, the triangle as shown in FIGS. 4a–4d. In every case, the recess should be an acute-bottom recess i.e. having a triangular section or the like. Combinations of recesses having different shapes on the plan view are also available.

Figure 6:
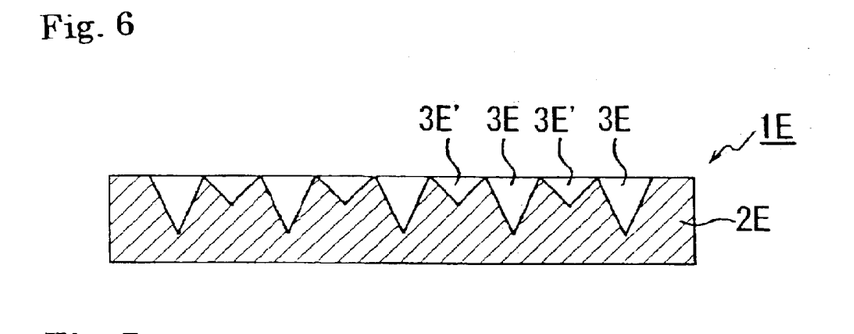
FIG. 6 is a sectional view showing another variation of the impact absorbing member of the present invention.

The impact absorbing member is not limited to the arrangement of the recesses, all of which have the same size. The impact absorbing member may be an impact absorbing member 1E comprising a plate-like body 2E and recesses 3E and 3E' having different depths wherein the recesses 3E and the recesses 3E' are alternately arranged as shown in FIG. 6.

Figure 7:
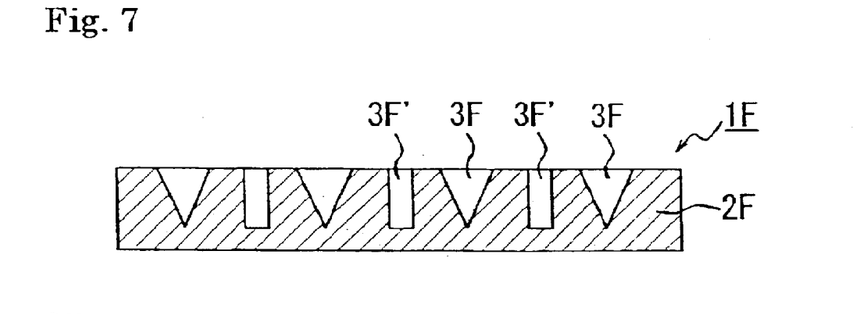
FIG. 7 is a sectional view showing still another variation of the impact absorbing member of the present invention.

Further, as shown in FIG. 7, the impact absorbing member may be an impact absorbing member 1F comprising a plate-like body 2F and recesses 3F, each having a triangular section, and recesses 3F', each having a non-triangular section (rectangular section in FIG. 7), which are alternately formed in the plate-like body 2F.

Figure 8:
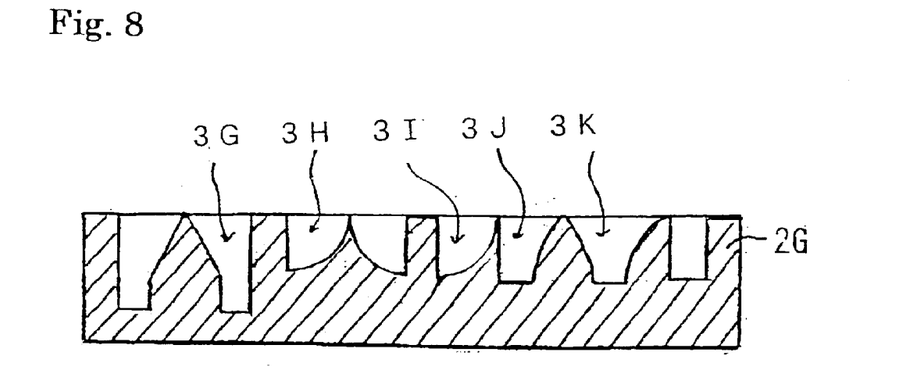
FIG. 8 is a sectional view showing further another variation of the impact absorbing member of the present invention.

The recesses of the impact absorbing member according to the present invention is not limited to have triangular sections, and may be a recess 3G having substantially trapezoidal section, a recess 3H, 3I, 3J, or 3K having substantially triangular or trapezoidal section having a curved portion. It is important that any one of the recesses has sectional area decreasing toward the deepest point.

In case of the acute-bottom recesses, the angle defined by the acute bottom (for example, $\theta$ in FIG. 1b) is preferably in a range of 15 to 135° in view of the energy absorbing capacity and the design of recesses.

The recesses may be arranged in two or more rows and the way of the arrangement is not limited to linear arrangement and may be staggered arrangement or the like. Suitable design of the arrangement, the shape, and the size of the recesses can control the energy absorbing capacity and can improve moldability, the directional stability, and the like of the impact absorbing member.

Figure 9A:
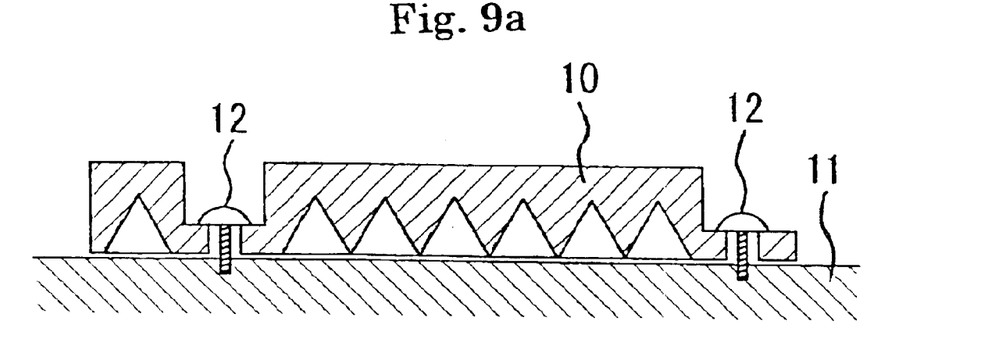
FIGS. 9a, 9b are sectional views showing examples of the method of installing the impact absorbing member of the present invention.
Figure 9B:
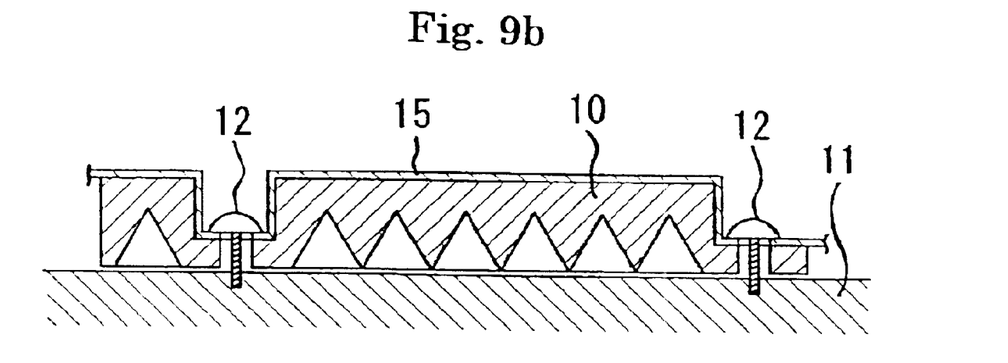
Figure 10:
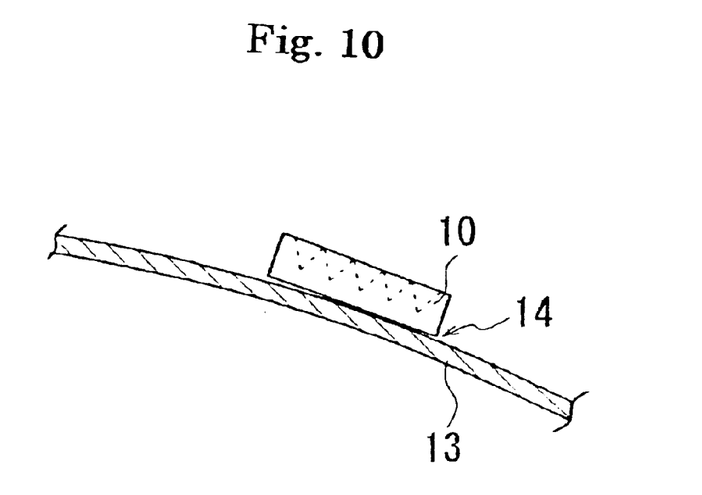
FIG. 10 is a sectional view showing another example of the method of installing the impact absorbing member of the present invention.
Figure 11A:
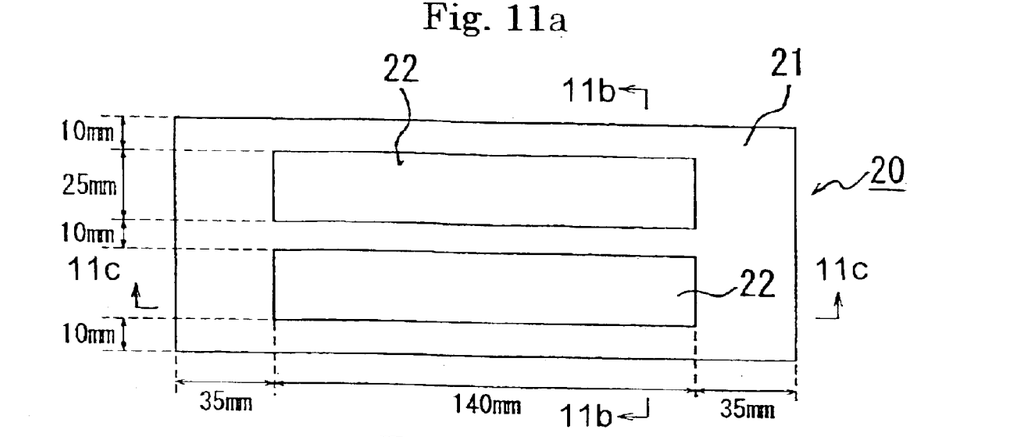
FIG. 11a is a plan view.
Figure 11B:
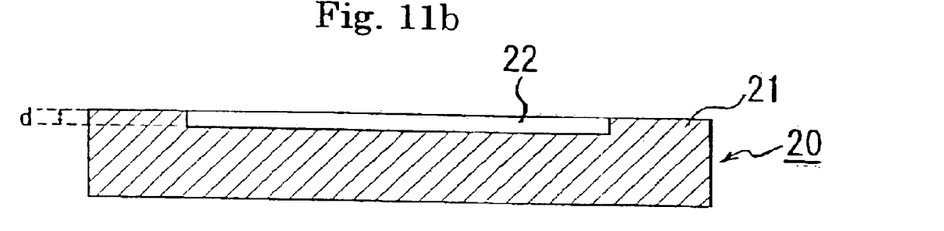
FIG. 11b is a sectional view taken along line 11b—11b of FIG. 11a, FIG. 11c is a sectional view taken along line 11c—11c of FIG. 11a, and FIG. 11d is a perspective view.
Figures 11C, 11D:
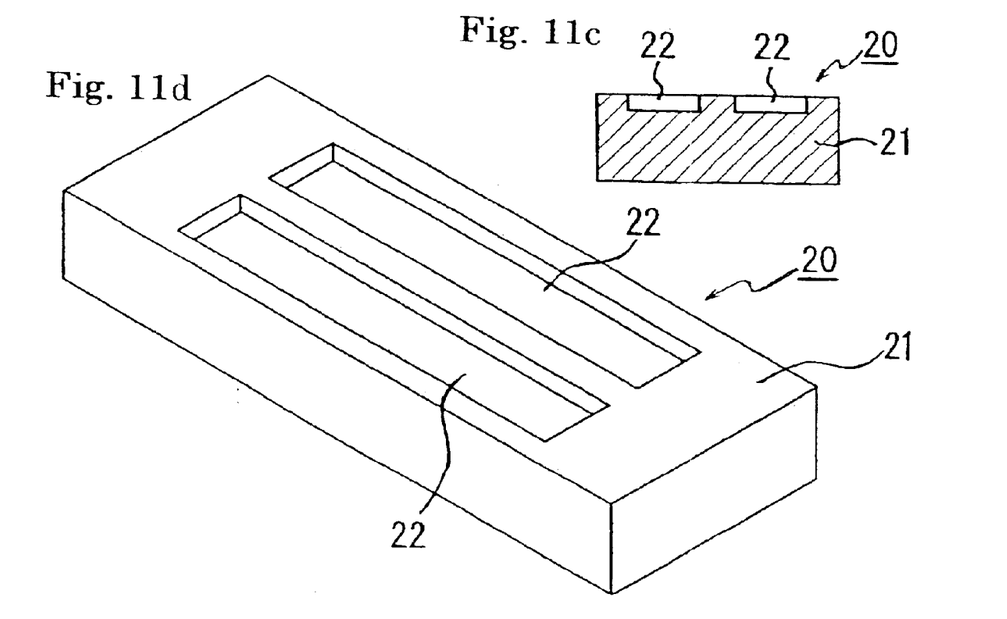

To attach the impact absorbing member of the present invention to a vehicle body, for example, as shown in FIG. 9a, the impact absorbing member 10 of the present invention is mechanically secured to a steel panel 11 of the vehicle body by tightening screws 12. Alternatively, as shown in FIG. 10, the impact absorbing member 10 of the present invention can be attached to an interior equipment (for example, a sheet for the ceiling) 13 by adhesives 14 or a self-adhesive tape. When the impact absorbing member is attached to a side rail or the like, the surface of the impact absorbing member 10 may be pressed and covered by a surfacing material 15 such as a steel panel or resin panel for stabilizing the properties against impact or the like as shown in FIG. 9b. Alternatively, the surfacing material 15 may be bonded or stuck to the impact absorbing member 10, thereby facilitating the installation of the impact absorbing member 10 to the vehicle body and further increasing the attachment strength.

When the impact absorbing member 10 is attached to the vehicle body, the recesses of the impact absorbing member may be arranged to face the vehicle cabin or the outside of the vehicle cabin. The attaching direction of the impact absorbing member may be suitably decided according to the directional stability and stability to the impact absorbing capacity.

The impact absorbing member of the present invention will be described in more details with reference to examples and comparative examples.

In the following examples and comparative examples, the energy absorbing capacity is evaluated by the head injury criteria value (HIC (d)) calculated from acceleration of impact exerted on a dummy in dynamic evaluation tests using dummies. In general, the HIC (d) of 1000 or less indicates excellent energy absorbing capacity. In car manufacturers, developments are made to have the HIC (d) of 800 or less for the purpose of increasing the certainty.

In the following examples and comparative examples, each impact absorbing member was manufactured by preparing a plate-like body made of rigid polyurethane foam having compressive strength of 1.5 MPa, of which outer dimension is 210 mm×80 mm ×30 mm (thickness), and forming recesses of predetermined shapes in the plate-like body (Comparative Example 1 has no recess). The total of the volume of the rigid polyurethane foam portions and the volume of the recesses of the impact absorbing member is 80 mm (width)×2100 mm (length)×30 mm (thickness)=504000 mm$^3$ (=504 cm$^3$). The recess volume ratio is obtained by dividing the volume of the recesses (hereinafter, referred to as "recess volume") by 504 cm$^3$ and is expressed by percentage.

EXAMPLES 1–3

Impact absorbing members as shown in FIGS. 1a–1d were made. In each of the impact absorbing members, two recesses, having dimensions shown in FIG. 1a and a depth d shown in Table 1, are formed in a plate-like body made of rigid polyurethane foam such that the recesses are arranged in parallel in the width direction and the recess volume and the recess volume ratio are shown in Table 1.

For the impact absorbing capacities, the head injury criteria values were measured and the results are shown in Table 1. In addition, the relation between the recess volume ratio and the head injury criteria value is shown in a graph of FIG. 12.

EXAMPLE 4

Figure 1A:
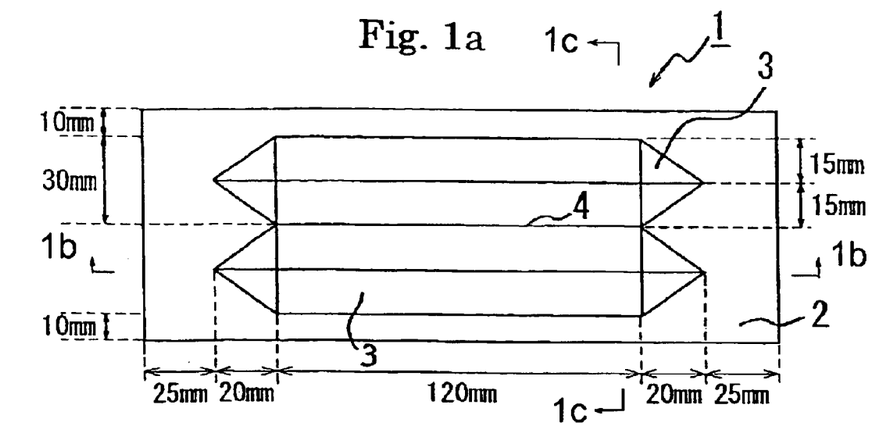
FIG. 1a is a plan view.
Figure 1B:
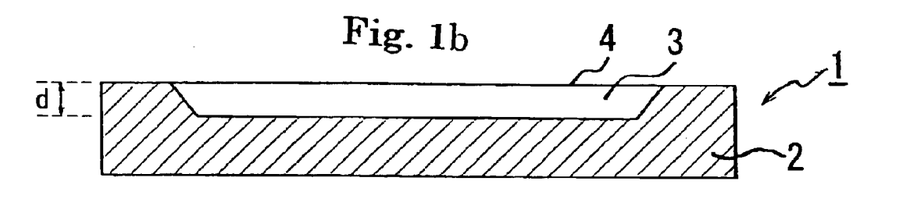
FIG. 1b is a sectional view taken along line 1b—1b of FIG. 1a, FIG. 1c is a sectional view taken along line 1c—1c of FIG. 1a, and FIG. 1d is a perspective view.
Figures 1C, 1D:
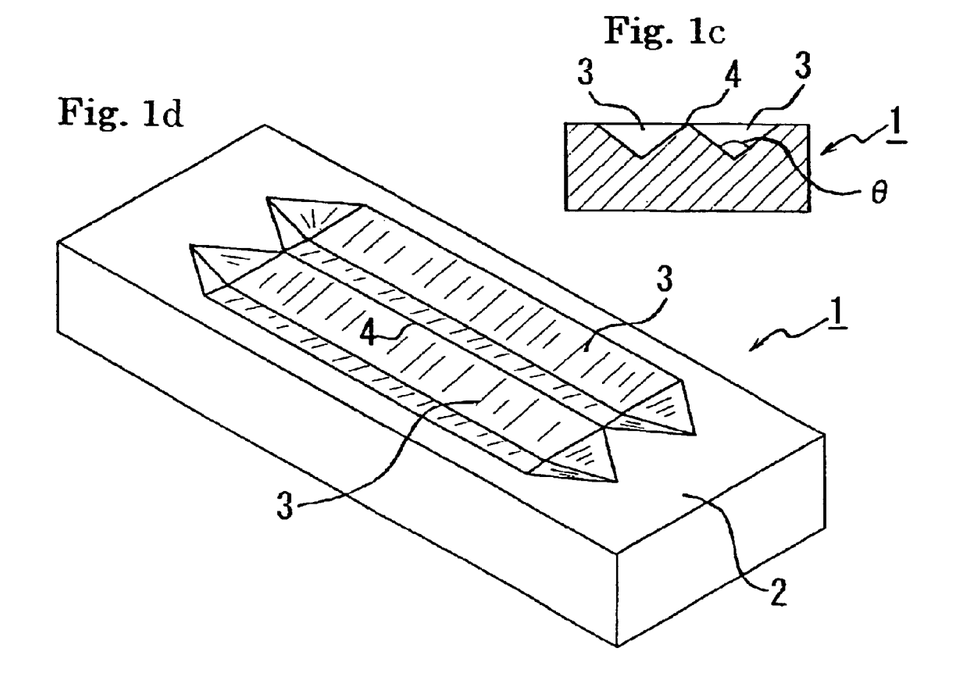
Figure 2A:
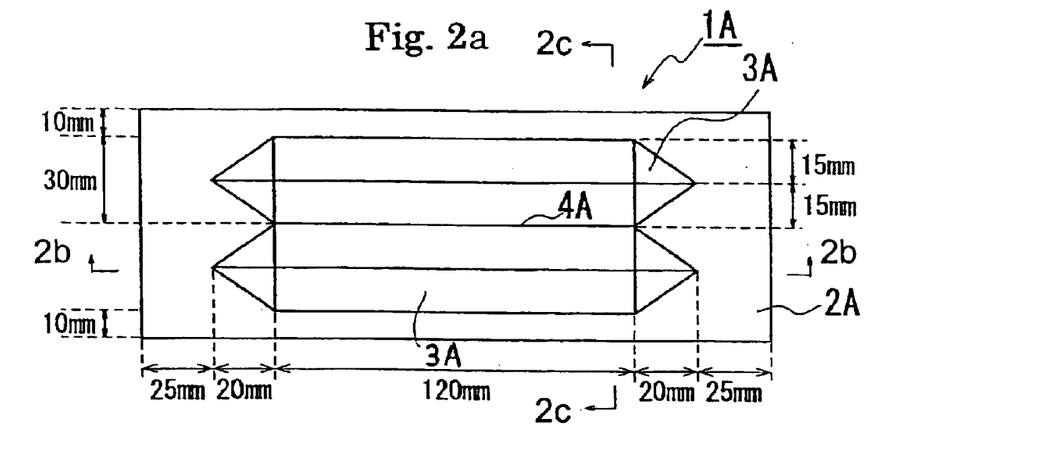
FIG. 2a is a plan view.
Figure 2B:
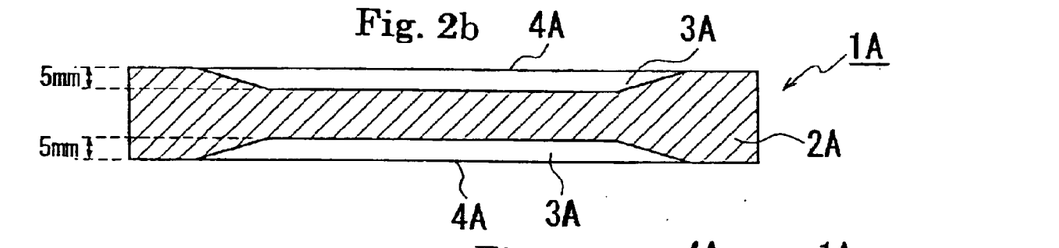
FIG. 2b is a sectional view taken along line 2b—2b of FIG. 2a, FIG. 2c is a sectional view taken along a line 2c—2c of FIG. 2a, and FIG. 2d is a perspective view.
Figures 2C, 2D:
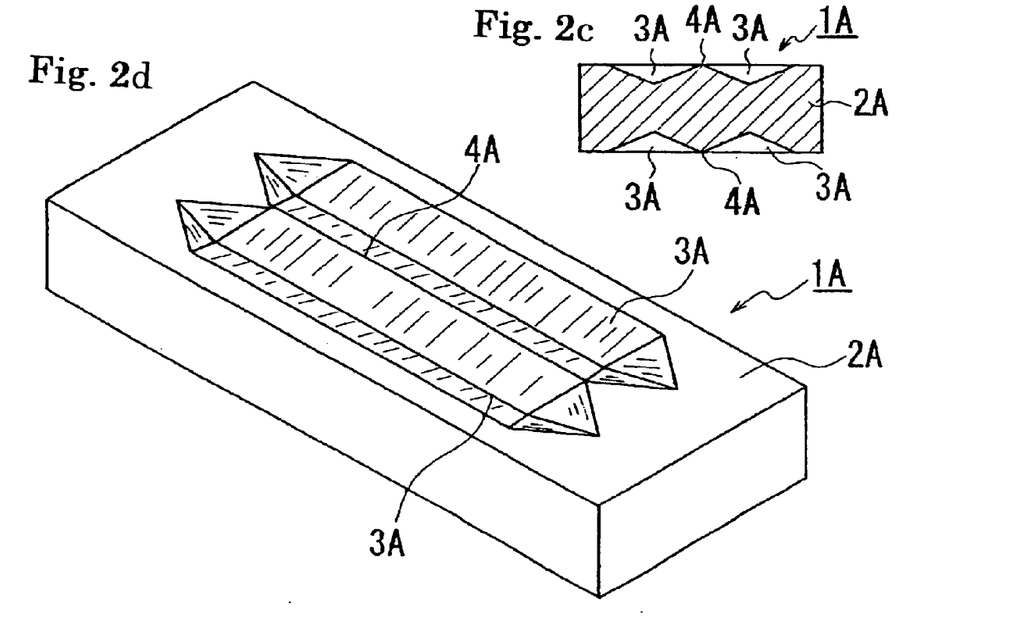
Figure 3A:
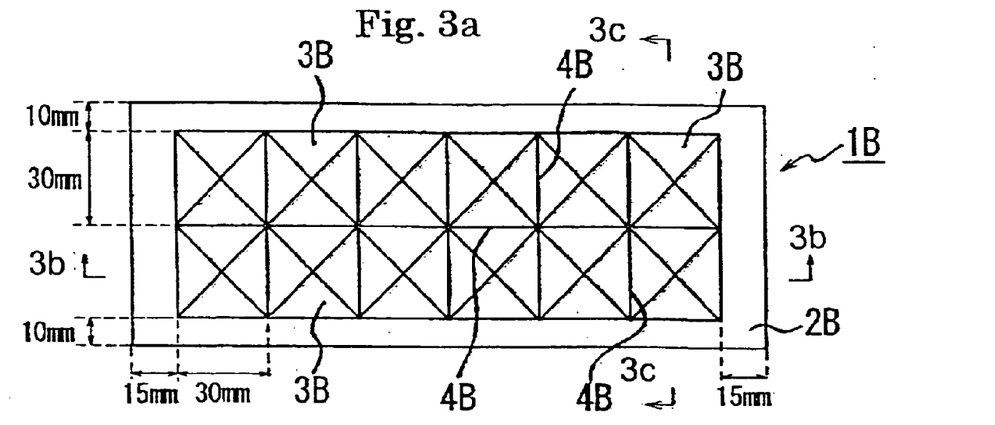
FIG. 3a is a plan view.
Figure 3B:
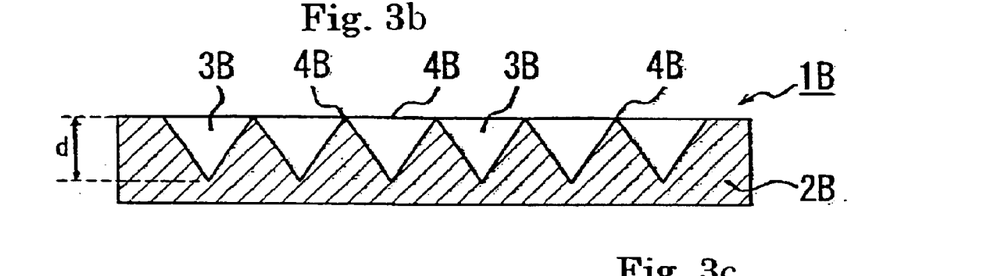
FIG. 3b is a sectional view taken along line 3b—3b of FIG. 3a, FIG. 3c is a sectional view taken along line 3c—3c of FIG. 3a, and FIG. 3d is a perspective view.
Figures 3C, 3D:
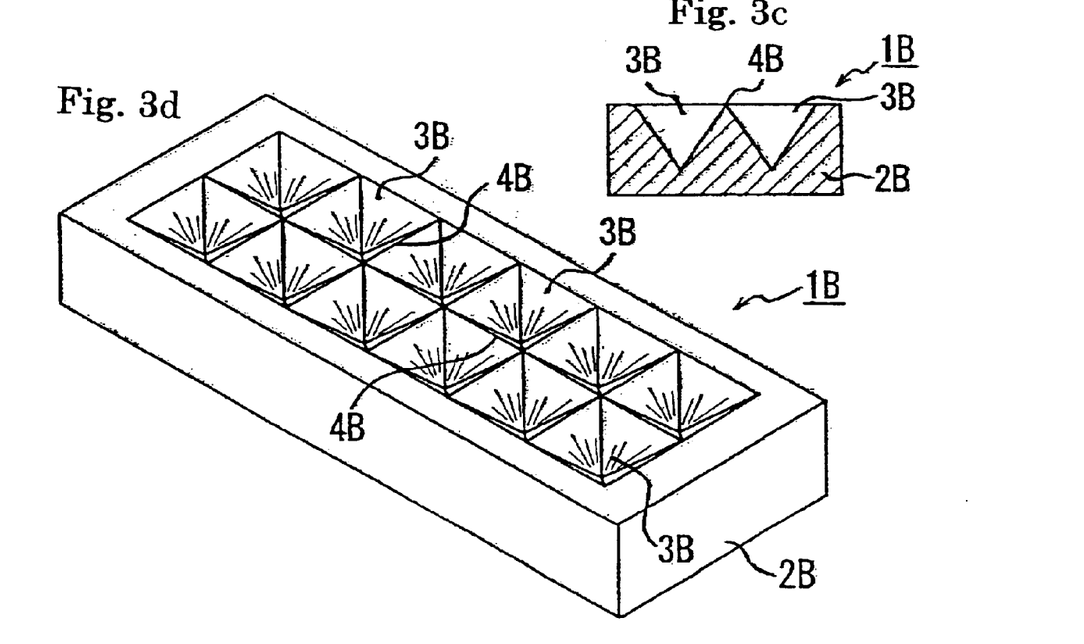

An impact absorbing member as shown in FIGS. 2a–2d was made. In the impact absorbing member, two recesses, having dimensions shown in FIGS. 2a, 2b, are formed in both surfaces of a plate-like body made of rigid polyurethane foam, respectively, such that the recesses are arranged in parallel in the width direction and the recess volume and the recess volume ratio are shown in Table 1.

Figure 12:
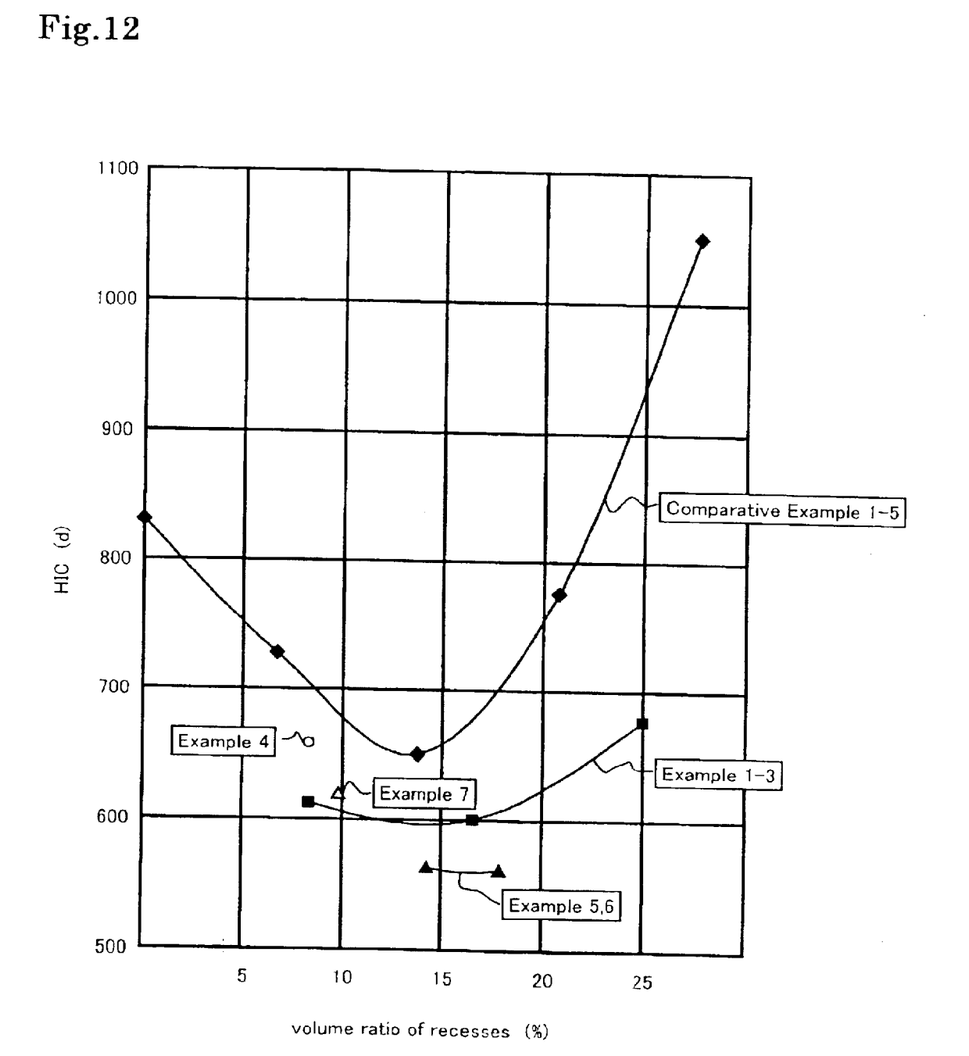
FIG. 12 is a graph showing the relation between the recess volume ratio and the head injury criteria value in the examples and the comparative examples.

For the impact absorbing capacity, the head injury criteria value was measured and the result is shown in Table 1. In addition, the relation between the recess volume ratio and the head injury criteria value is shown in the graph of FIG. 12.

TABLE 1

| Example | depth of recesses d (mm) | volume of recesses (cm$^3$) | volume ratio of recesses (%)(note 1) | HIC (d) |
|---|---|---|---|---|
| 1 | 10 | 42 | 8.3(12.5) | 612 |
| 2 | 20 | 84 | 16.7(25.0) | 600 |
| 3 | 30 | 126 | 25.0(37.5) | 678 |
| 4 | 10(note2) | 42 | 8.3(12.5) | 659 |

※(note 1):
Each value in parentheses denotes the volume ratio of the recesses only of central region as long as 30 mm in the longitudinal direction of the impact absorbing member.
※(note 2):
The value denotes the total depths of the recesses on the both surfaces of the impact absorbing member.

EXAMPLES 5, 6

Impact absorbing members as shown in FIGS. 3a–3d were made. In each of the impact absorbing members, recesses, having dimensions shown in FIG. 3a and a depth d shown in Table 2, are formed in a plate-like body made of rigid polyurethane foam such that the recesses are arranged in two rows in the width direction and in six rows in the longitudinal direction and the recess volume and the recess volume ratio are shown in Table 2.

For the impact absorbing capacities, the head injury criteria values were measured and the results are shown in Table 2. In addition, the relation between the recess volume ratio and the head injury criteria value is shown in the graph of FIG. 12.

TABLE 2

| Example | depth of recesses d (mm) | volume of recesses (cm$^3$) | volume ratio of recesses (%)(note 1) | HIC (d) |
|---|---|---|---|---|
| 5 | 20 | 72 | 14.3(17) | 563 |
| 6 | 25 | 90 | 17.9(21) | 560 |

※(note 1):
Each value in parentheses denotes the volume ratio of the recesses only of central region as long as 30 mm in the longitudinal direction of the impact absorbing member.

EXAMPLE 7

Figure 4A:
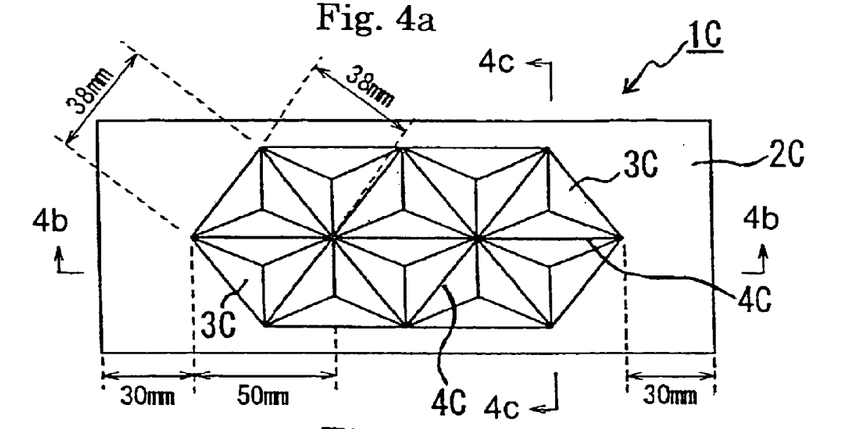
FIG. 4a is a plan view.
Figure 4B:
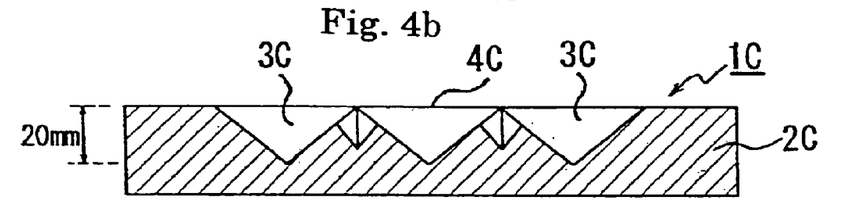
FIG. 4b is a sectional view taken along a line 4b—4b of FIG. 4a, FIG. 4c is a sectional view taken along a line 4c—4c of FIG. 4a, and FIG. 4d is a perspective view.
Figures 4C, 4D:
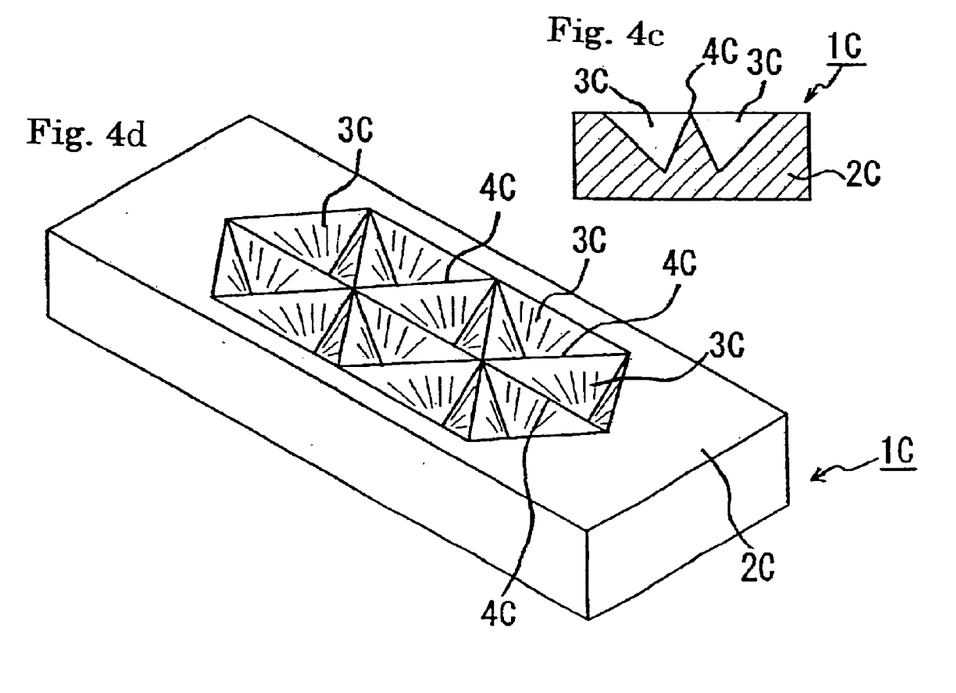
Figure 5:
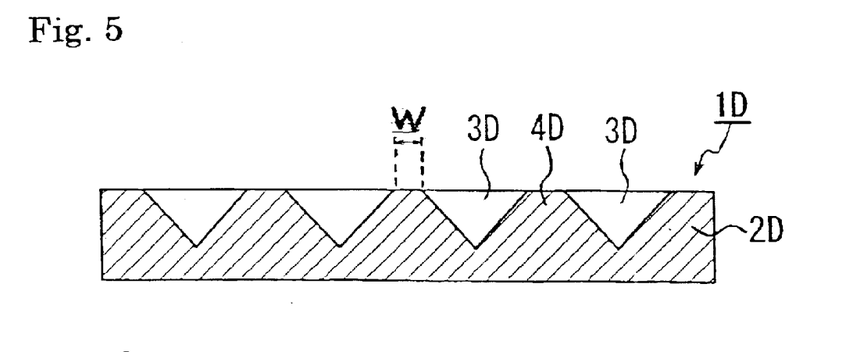
FIG. 5 is a sectional view showing a variation of the impact absorbing member of the present invention.

An impact absorbing member as shown in FIGS. 4(a)–4(d) was made. In the impact absorbing member, ten recesses, having dimensions shown in FIGS. 4(a), 4(b), are formed in a plate-like body made of rigid polyurethane foam, such that the ten recesses are arranged in parallel and the recess volume and the recess volume ratio are shown in Table 3.

For the impact absorbing capacity, the head injury criteria value was measured and the result is shown in Table 3. In addition, the relation between the recess volume ratio and the head injury criteria value is shown in the graph of FIG. 12.

TABLE 3

| Example | volume of recesses (cm$^3$) | volume ratio of recesses (%)(note 1) | HIC (d) |
|---|---|---|---|
| 7 | 50 | 9.9(14) | 618 |

※(note 1):
Each value in parentheses denotes the volume ratio of the recesses only of central region as long as 30 mm in the longitudinal direction of the impact absorbing member.

COMPARATIVE EXAMPLE 1

A plate-like body made of rigid polyurethane foam was made which is the same as the plate-like body of Example 1, but is formed with no recess. The head injury criteria value was measured and the result is shown in Table 4. In addition the relation between the recess volume ratio (0%) and the head injury criteria value is shown in the graph of FIG. 12.

COMPARATIVE EXAMPLES 2–5

Impact absorbing members as shown in FIGS. 11a–11d were made. In each of the impact absorbing members 20, two rectangular recesses 22 having dimensions shown in FIG. 11a and a depth d shown in Table 4 are formed in a plate-like body 21 made of rigid polyurethane foam such that the recesses are arranged in parallel to leave a space of 10 mm and the recess volume and the recess volume ratio are shown in Table 4.

For the impact absorbing capacities, the head injury criteria values were measured and the results are shown in Table 4. In addition, the relation between the recess volume ratio and the head injury criteria value is shown in a graph of FIG. 12.

TABLE 4

| Comparative Example | depth of recesses d (mm) | volume of recesses (cm³) | volume ratio of recesses (%)(note 1) | HIC (d) |
|---|---|---|---|---|
| 1 | 0 | 0 | 0 | 830 |
| 2 | 5 | 35 | 6.9(10) | 728 |
| 3 | 10 | 70 | 13.9(21) | 650 |
| 4 | 15 | 105 | 20.8(31) | 775 |
| 5 | 20 | 140 | 27.8(42) | 1050 |

※(note 1):
Each value in parentheses denotes the volume ratio of the recesse only of central region as long as 30 mm in the longitudinal direction of the impact absorbing member.

It was found from the above results that the impact absorbing members formed with acute-bottom recesses according to the present invention can reduce the head injury criteria value without change in the recess volume ratio.

As described in the above, the present invention can provide an energy absorbing member for use in vehicles which has excellent energy absorbing capacity and is suitably adapted to absorb impact energy exerted on the head of an occupant in a vehicle cabin to reduce the head injury criteria value in the event of a vehicle collision.

Figure 13A:
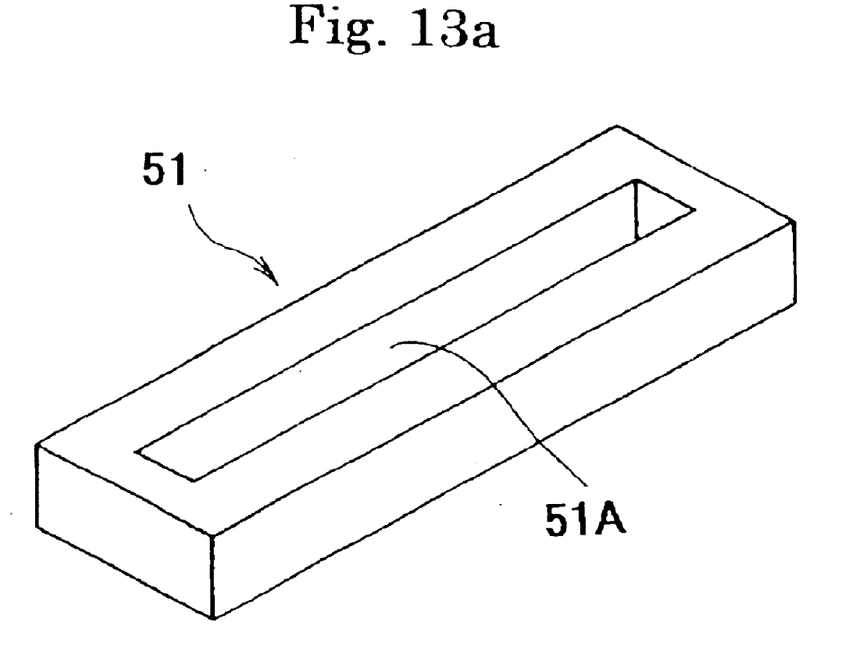
FIG. 13a shows a perspective view of an embodiment of the head protective member of the present invention.
Figure 13B:
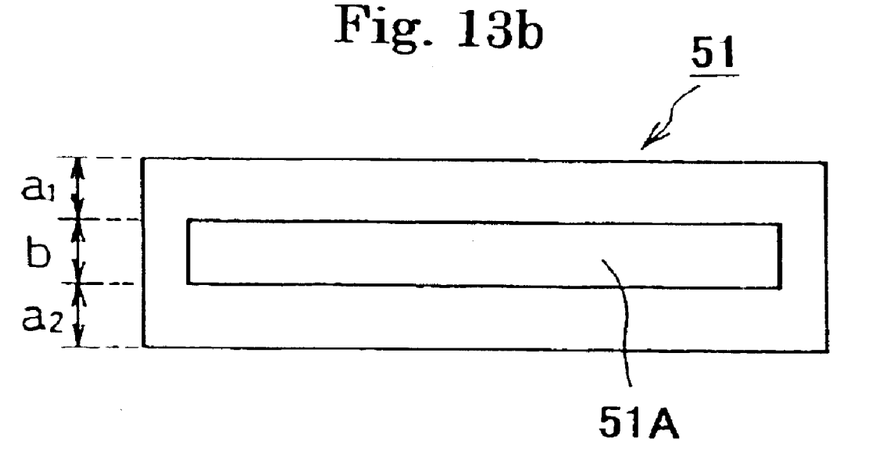
FIG. 13b is a plan view thereof.
Figure 14A:
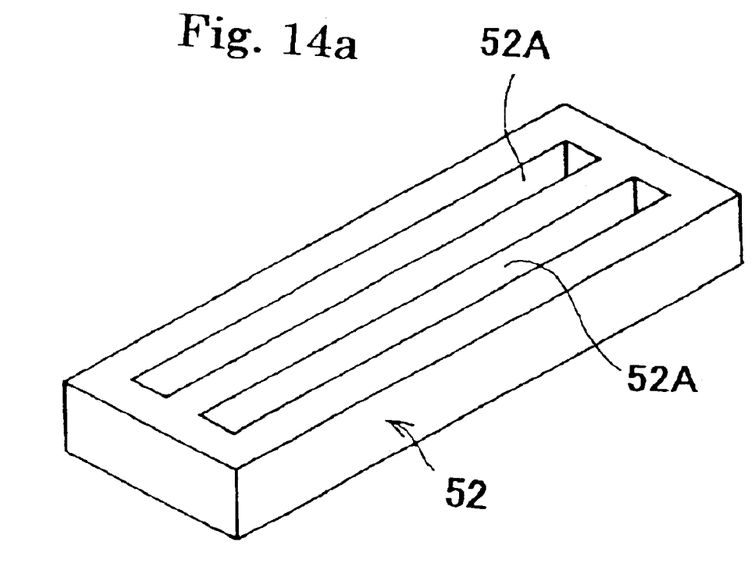
FIG. 14a shows a perspective view of another embodiment of the head protective member of the present invention.
Figure 14B:
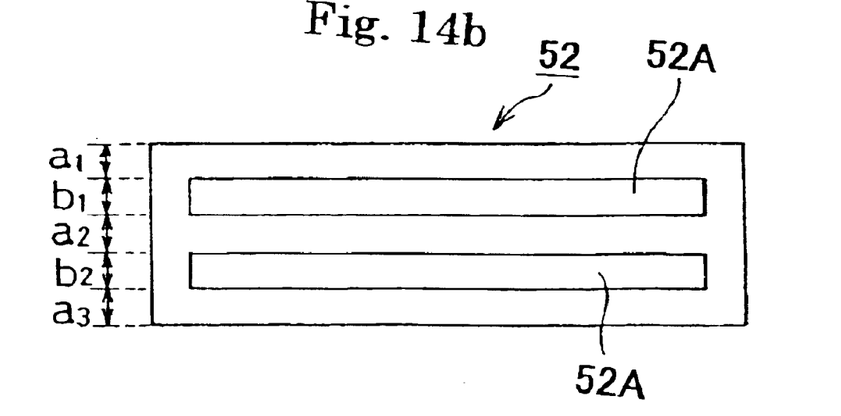
FIG. 14b is a plan view thereof.
Figure 15A:
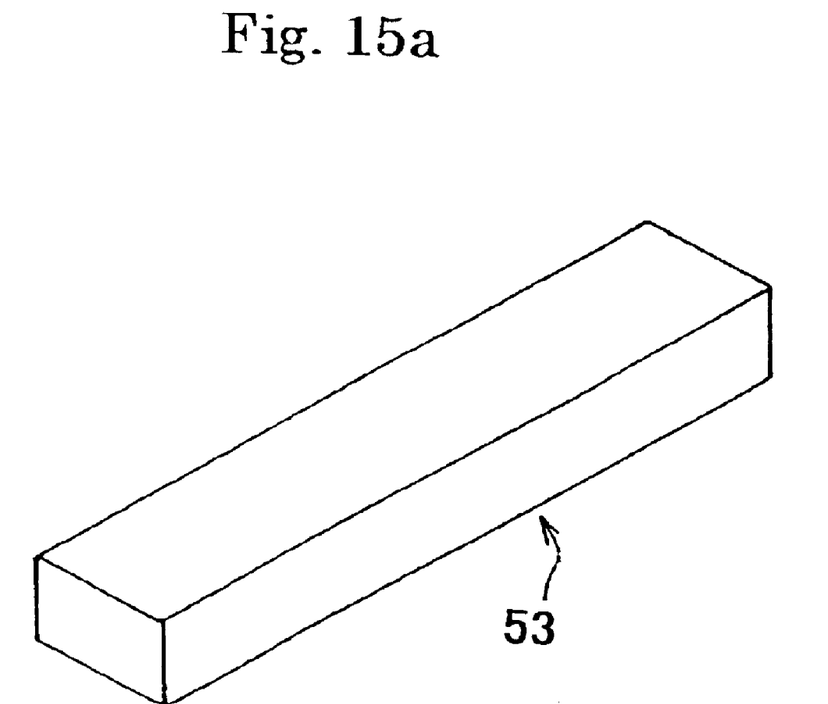
FIG. 15a shows a perspective view of further another embodiment of the head protective member of the present invention.
Figure 15B:
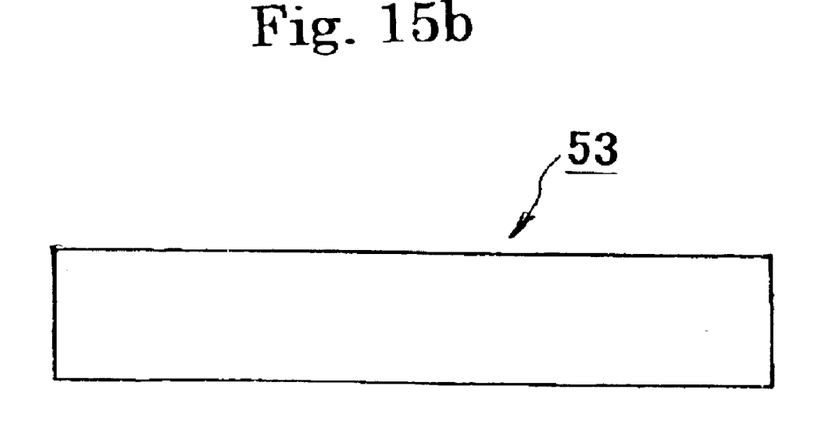
FIG. 15b is a plan view thereof.

FIGS. 13a through 15b are views showing embodiments of the head protective member of the present invention, wherein FIGS. 13a, 14a, and 15a are perspective views and FIGS. 13b, 14b, and 15b are plan views.

The head protective member of the present invention is constituted of a rigid polyurethane foam having hardness of at least 0.3 MPa. The thickness of the head protective member is in a range from 15 to 25 mm and the effective width is in a range from 30 to 40 mm. With the thickness and the effective width deviating from these ranges, it is hard to achieve the head protective member having an HIC (head injury criteria) value of 800 or less.

Concretely, the head protective member of the present invention has the following configuration I or II, but not limited thereto.

I. As shown in FIGS. 13a, 13b, a head protective member 51 has a slit 51A which is formed by hollowing in the depth direction to extend in the longitudinal direction. In this case, as shown in FIGS. 14a, 14b, the head protective member may have two slits 52A arranged in parallel to each other and, alternatively, may have three or more slits.

In this configuration, the effective width, that is, the sum of widths of solid portions other than the slit(s) (a1+a2 in FIG. 1b, a1+a2+a3 in FIG. 2b) is set to be 30 to 40 cm.

The width of the slit(s) (b1 in FIG. 1b, b1, b2 in FIG. 2b) is preferably 5 to 20 cm. The width of the solid portions other than the slit(s) (a1, a2 in FIG. 13b, a1, a2, a3 in FIG. 14b) is suitably set in such a manner that the effective width is 30 to 40 cm according to the width and the number of the slit(s).

When a plurality of slits are formed, the respective width of the slits may be the same or different from one another. The width of the solid portions may also be the same or different from one another.

According to the present invention, when the head protective member has the slit(s), the hardness of the material constituting the head protective member is preferably 1.2 to 1.6 MPa. In the head protective member having the slit(s), the configuration of the slit is not limited to a rectangular shape in its plan view as shown in FIGS. 13a to 14b and may be an oval shape or other shape.

It should be noted that an actual molded product has thin burrs on one of open ends of the slit. There is a possibility that the burrs close the open end. However, even if one of open ends is closed, it is not a problem on the performance of the head protective member when the thickness of the closed portion is ¼ or less of the entire thickness.

II. As shown in FIGS. 15a, 15b, a head protective member 53 like a plate does not have a slit which is formed by hollowing in the depth direction. In this case, the effective width is the width of the body. In case of the head protective member 53 having no slit, the hardness of the material constituting the head protective member 53 is preferably 1.0 to 1.4 MPa.

Figure 16A:
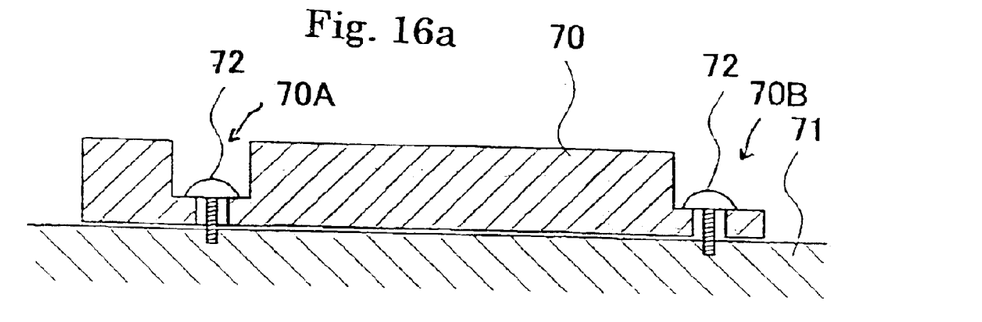
FIGS. 16a and 16b are sectional views showing examples of the method of installing the head protective member of the present invention.
Figure 16B:
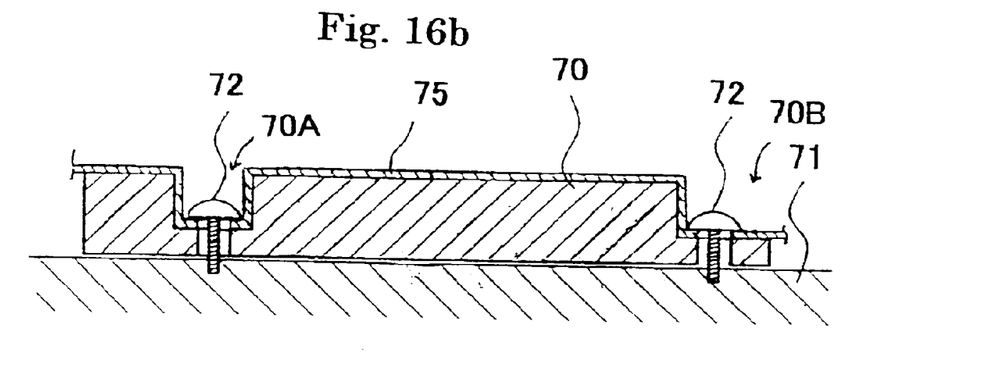
Figure 17:
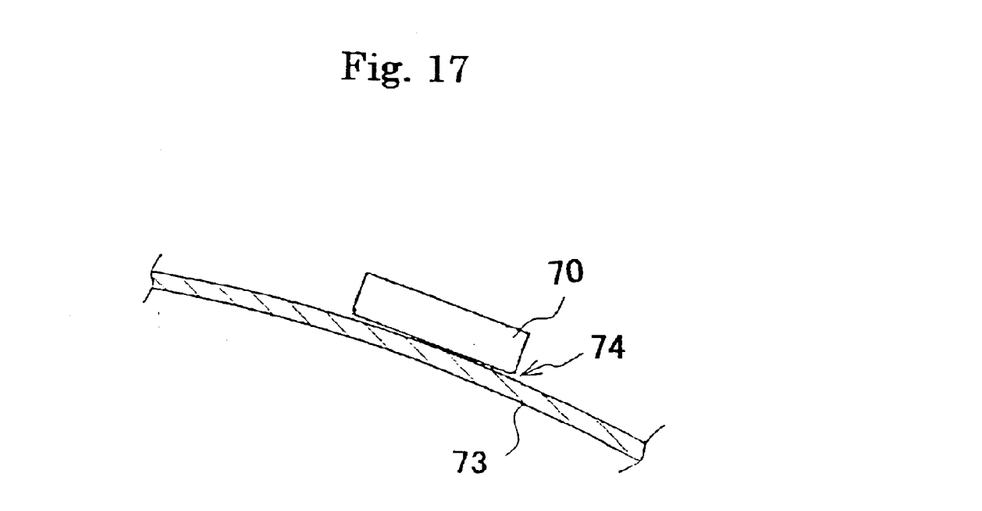
FIG. 17 is a sectional view showing another example of the method of installing the head protective member of the present invention.

To attach the head protective member of the present invention to a vehicle body, for example, as shown in FIG. 16a, the head protective member 70 of the present invention is previously formed with a recess 70A, a stepped portion 70B, and screw holes and is mechanically secured to a steel panel 71 of the vehicle body by tightening screws 72 into the screw holes. Alternatively, as shown in FIG. 17, the head protective member 70 of the present invention can be attached to interior equipment (for example, a sheet for the ceiling) 73 by adhesives 74 or a self-adhesive tape. When the head protective member is attached to a side rail or the like, the surface of the head protective member 70 may be pressed and covered by a surfacing material 75 such as a steel panel or resin panel for stabilizing the properties against impact or the like as shown in FIG. 16b. Alternatively, the surfacing material 75 may be bonded or stuck to the head protective member 70, thereby facilitating the installation of the head protective member 70 to the vehicle body and further increasing the attachment strength.

The head protective member of the present invention will be described in more details with reference to examples.

EXAMPLE 8

Head protective members having configurations and dimensions shown in Table 5 were manufactured by rigid polyurethane foams having hardness and density shown in Table 5.

The respective HIC values of the head protective members were measured and the results are shown in Table 5.

TABLE 5

| No. of Example | 8 | 9 | 10 | 11 |
|---|---|---|---|---|
| Figure(s) which shows the shape of the protective member | FIGS. 13a, 13b | FIGS. 13a, 13b | FIGS. 14a, 14b | FIG. 15a |

TABLE 5-continued

| No. of Example | | 8 | 9 | 10 | 11 |
|---|---|---|---|---|---|
| dimensions of protective member | | thickness = 20 mm a1 = a2 = 15 mm (effective width = 30 mm) b = 10 mm | thickness = 20 mm a1 = a2 = 15 mm (effective width = 30 mm) b = 15 mm | thickness = 20 mm a1 = a2 = a3 = 10 mm (effective width = 30 mm) b1 = b2 = 10 mm | thickness = 20 mm width = 30 mm (effective width = 30 mm) |
| hardness (MPa) ※ | 1.0 (0.097) | 986 | 1132 | 1102 | 766 |
| | 1.2 (0.110) | 833 | 830 | 862 | 718 |
| | 1.3 (0.116) | — | — | — | 817 |
| | 1.4 (0.122) | 790 | 801 | 783 | 813 |
| | 1.6 (0.134) | 807 | 804 | 795 | 833 |

※ The value in parentheses denotes density.

It can be found from Table 5 that head protective members having excellent energy absorbing capacity with HIC values of 1000 or less, particularly 800 or less, can be achieved according to the present invention.

As described in the above, the present invention can provide a head protective member for use in a vehicle which has excellent energy absorbing capacity and is suitably adapted to absorb impact energy exerted on the head of an occupant in a vehicle cabin to reduce the head injury criteria value in the event of a vehicle collision.

The head protective member of the present invention can achieve the HIC value of 800 or less with a simple configuration, thereby contributing the reduction in the manufacturing cost. Therefore, the head protective member of the present invention is industrially extremely advantageous.

What is claimed is:

1. An impact absorbing member comprising a body made of rigid polyurethane foam in a plate shape, and having recesses on one surface thereof arranged in parallel along one direction, each of said recesses having a size decreasing toward a bottom and one pointed portion extending in a depth direction of the body, each of said recesses having at least three inclined bottom surfaces extending from an upper surface of the body toward the depth direction and joining together at said one pointed portion.

2. An impact absorbing member as claimed in claim 1, wherein said each of the recesses has a triangle section in the depth direction of the body.

3. An impact absorbing member as claimed in claim 1, wherein said rigid polyurethane foam has a compressive strength at least $3 \times 10^{-1}$ MPa.

4. An impact absorbing member as claimed in claim 1, wherein said recesses have a volume ratio of 3 to 40% relative to a total volume of the rigid polyurethane foam and the recesses.

5. An impact absorbing member as claimed in claim 4, wherein the body has an elongated shape in one direction and said recesses are formed in a portion other than both end portions of the body in a longitudinal direction.

6. An impact absorbing member as claimed in claim 1, wherein the body is used as a head protective member attached to a vehicle body or interior equipment including a head liner and a garnish.

7. An impact absorbing member as claimed in claim 1, wherein each of said at least three inclined bottom surfaces has a triangular shape and joined together at one point forming said one pointed portion.

8. An impact absorbing member as claimed in claim 1, wherein each of said recesses has two rectangular bottom surfaces extending along a lateral direction thereof and joining together to form a laterally extending joining portion constituting the one pointed portion.

9. An impact absorbing member as claimed in claim 8, wherein each of said recesses has two lateral side portions, each of said two lateral side portions having inclined side surfaces extending from the upper surface of the body to the laterally extending joining portion.

* * * * *